United States Patent
Pilebro et al.

(10) Patent No.: US 9,657,998 B2
(45) Date of Patent: May 23, 2017

(54) METHOD FOR OPERATING AN ARRANGEMENT FOR STORING THERMAL ENERGY

(71) Applicant: Skanska Sverige AB, Stockholm (SE)

(72) Inventors: Hans Pilebro, Enebyberg (SE); Tobias Strand, Farsta (SE)

(73) Assignee: SKANSKA SVERIGE AB, Stockholm (SE)

( * ) Notice: Subject to any disclaimer, the term of this patent is extended or adjusted under 35 U.S.C. 154(b) by 0 days.

(21) Appl. No.: 14/439,760

(22) PCT Filed: Nov. 1, 2013

(86) PCT No.: PCT/SE2013/051281
§ 371 (c)(1),
(2) Date: Apr. 30, 2015

(87) PCT Pub. No.: WO2014/070096
PCT Pub. Date: May 8, 2014

(65) Prior Publication Data
US 2015/0292809 A1 Oct. 15, 2015

(30) Foreign Application Priority Data

Nov. 1, 2012 (SE) ........................................ 1251241

(51) Int. Cl.
*F28D 17/00* (2006.01)
*F28D 20/00* (2006.01)
(Continued)

(52) U.S. Cl.
CPC ........... *F28D 20/0034* (2013.01); *F24D 3/08* (2013.01); *F24D 19/1066* (2013.01);
(Continued)

(58) Field of Classification Search
CPC ............. F28D 20/0034; F28D 20/0039; F28D 20/0052; F28D 2020/0069; F24D 3/08; F24D 19/1066; F24D 2200/11
(Continued)

(56) References Cited

U.S. PATENT DOCUMENTS 1,639,172 A    8/1927   Forcada
2,737,789 A    3/1956   Ruff
(Continued)

FOREIGN PATENT DOCUMENTS

CA    2413819      6/2004
CN    102077050    5/2011
(Continued)

OTHER PUBLICATIONS

Extended European Search Report, European Application No. 13851337, mailed Dec. 17, 2015 (2 pages).
(Continued)

*Primary Examiner* — Ljiljana Ciric
(74) *Attorney, Agent, or Firm* — Kagan Binder, PLLC

(57) ABSTRACT

A method for operating an arrangement (1) for storing thermal energy where the arrangement (1) includes an energy storage (2) having a temperature gradient. The method involves retrieving energy at a first temperature ($T_1$) from the energy storage (2) for use in a first heat-absorbing system (3), such that free space is created in the energy storage (2) for energy at a second temperature ($T_2$). The second temperature ($T_2$) is higher than the first temperature ($T_1$).

11 Claims, 1 Drawing Sheet

(51) Int. Cl.
*F24D 3/08* (2006.01)
*F24D 19/10* (2006.01)

(52) U.S. Cl.
CPC ..... *F28D 20/0039* (2013.01); *F28D 20/0052* (2013.01); *F24D 2200/11* (2013.01); *F24D 2200/123* (2013.01); *F28D 2020/0069* (2013.01); *Y02B 10/40* (2013.01); *Y02E 60/142* (2013.01); *Y02P 80/15* (2015.11)

(58) Field of Classification Search
USPC ............................................................ 165/45
See application file for complete search history.

(56) References Cited

U.S. PATENT DOCUMENTS

| | | | |
|---|---|---|---|
| 2,766,200 A | 10/1956 | Kaufman | |
| 2,818,118 A | 12/1957 | Dixon | |
| 2,962,095 A | 5/1961 | Namur | |
| 3,097,694 A | 7/1963 | Kerver | |
| 3,227,211 A | 1/1966 | Gilchrist | |
| 3,402,769 A | 9/1968 | Doggett et al. | |
| 3,427,652 A | 2/1969 | Seay | |
| 3,448,792 A | 6/1969 | Lawrence | |
| 3,470,943 A | 10/1969 | Van Huisen | |
| 3,580,330 A * | 5/1971 | Maugis | F24J 3/085 165/135 |
| 3,593,791 A | 7/1971 | Parker | |
| 3,640,336 A | 2/1972 | Dixon | |
| 3,679,264 A | 7/1972 | Van Huisen | |
| 3,685,330 A | 8/1972 | Funke | |
| 3,701,262 A * | 10/1972 | Connell | F17C 3/005 405/53 |
| 3,737,105 A | 6/1973 | Arnold et al. | |
| 3,757,516 A * | 9/1973 | McCabe | F01K 7/00 165/45 |
| 3,786,858 A | 1/1974 | Potter et al. | |
| 3,807,491 A * | 4/1974 | Van Hulsen | E02B 3/00 165/45 |
| 3,817,038 A * | 6/1974 | Paull | F03G 7/04 165/45 |
| 3,857,244 A * | 12/1974 | Faucette | F03G 7/04 165/45 |
| 3,863,709 A * | 2/1975 | Fitch | E21B 43/17 159/902 |
| 3,864,208 A | 2/1975 | Van Huisen | |
| 3,878,884 A | 4/1975 | Raleigh | |
| 3,921,405 A | 11/1975 | Rosciszewski | |
| 3,923,248 A | 12/1975 | Cresswell | |
| 3,931,851 A | 1/1976 | Harris et al. | |
| 3,939,356 A | 2/1976 | Loane | |
| 3,943,722 A * | 3/1976 | Ross | E02D 3/115 165/45 |
| 3,957,108 A | 5/1976 | Van Huisen | |
| 3,965,972 A * | 6/1976 | Petersen | F24F 5/0046 126/640 |
| 3,967,675 A | 7/1976 | Georgii | |
| 3,986,339 A * | 10/1976 | Janelid | B65G 5/00 165/45 |
| 3,986,362 A * | 10/1976 | Baciu | F01K 3/181 165/45 |
| 3,991,817 A | 11/1976 | Clay | |
| 4,008,709 A * | 2/1977 | Jardine | F28D 20/0043 126/400 |
| 4,030,549 A * | 6/1977 | Bouck | E21B 43/2401 165/45 |
| 4,031,952 A | 6/1977 | Contour | |
| 4,044,830 A | 8/1977 | Van Huisen | |
| 4,047,093 A * | 9/1977 | Levoy | F24J 3/085 165/104.26 |
| 4,060,988 A * | 12/1977 | Arnold | E21B 43/24 165/45 |
| 4,078,904 A | 3/1978 | Galt et al. | |
| 4,079,590 A | 3/1978 | Sheinbaum | |
| 4,121,429 A * | 10/1978 | Grennard | F17C 3/005 165/45 |
| 4,137,720 A * | 2/1979 | Rex | F03G 7/04 165/45 |
| 4,139,056 A * | 2/1979 | Scholl | F28D 20/0039 126/400 |
| 4,143,816 A | 3/1979 | Skadeland | |
| 4,147,204 A | 4/1979 | Pfenninger | |
| 4,149,389 A | 4/1979 | Hayes et al. | |
| 4,157,730 A * | 6/1979 | Despois | E21B 43/305 165/45 |
| 4,174,009 A | 11/1979 | Laing et al. | |
| 4,194,856 A * | 3/1980 | Jahns | E02D 31/14 165/45 |
| 4,200,152 A * | 4/1980 | Foster | E21B 41/005 165/45 |
| 4,201,060 A | 5/1980 | Outmans | |
| 4,210,201 A | 7/1980 | O'Hanlon | |
| 4,211,613 A * | 7/1980 | Meckler | C02F 1/14 159/902 |
| 4,219,074 A * | 8/1980 | Hansen | F28D 20/0052 165/104.11 |
| 4,223,729 A * | 9/1980 | Foster | E21B 43/17 165/45 |
| 4,234,037 A * | 11/1980 | Rogers | F24F 5/0046 126/400 |
| 4,235,221 A * | 11/1980 | Murphy | F03G 6/00 126/562 |
| 4,241,724 A * | 12/1980 | Hull | F24J 2/0466 126/567 |
| 4,271,681 A * | 6/1981 | Schertz | F25D 3/04 165/104.11 |
| 4,286,141 A | 8/1981 | MacCracken | |
| 4,286,574 A | 9/1981 | Vrolyk et al. | |
| 4,290,266 A * | 9/1981 | Twite | F03G 7/04 165/45 |
| 4,291,751 A * | 9/1981 | Wolf | F24F 5/0046 165/179 |
| 4,297,847 A * | 11/1981 | Clayton | F03G 7/04 165/45 |
| 4,345,652 A | 8/1982 | Roque | |
| 4,351,651 A * | 9/1982 | Courneya | E03B 3/28 165/111 |
| 4,361,135 A * | 11/1982 | Metz | F24D 11/00 126/400 |
| 4,363,563 A | 12/1982 | Hallenius et al. | |
| 4,375,157 A * | 3/1983 | Boesen | E21B 36/003 165/104.21 |
| 4,392,351 A | 7/1983 | Doundoulakis | |
| 4,392,531 A * | 7/1983 | Ippolito | E21B 43/04 165/45 |
| 4,399,656 A | 8/1983 | Laing et al. | |
| 4,401,162 A | 8/1983 | Osborne | |
| 4,402,188 A | 9/1983 | Skala | |
| 4,415,034 A | 11/1983 | Bouck | |
| 4,418,549 A * | 12/1983 | Courneya | E03B 3/28 165/111 |
| 4,440,148 A * | 4/1984 | Assaf | F24J 2/0466 126/400 |
| 4,448,237 A * | 5/1984 | Riley | F24D 11/0214 165/45 |
| 4,462,463 A | 7/1984 | Gorham, Jr. | |
| 4,476,932 A | 10/1984 | Emery | |
| 4,479,541 A | 10/1984 | Wang | |
| 4,498,454 A * | 2/1985 | Assaf | F28D 20/0043 126/561 |
| 4,505,322 A | 3/1985 | Larson | |
| 4,510,920 A * | 4/1985 | Walmet | F24J 2/0466 126/561 |
| 4,522,254 A | 6/1985 | Koizumi et al. | |
| 4,554,797 A | 11/1985 | Goldstein | |
| 4,566,527 A * | 1/1986 | Pell | F28D 15/04 165/104.21 |
| 4,577,679 A * | 3/1986 | Hibshman | F24J 3/085 165/236 |
| 4,607,488 A * | 8/1986 | Karinthi | E02D 3/115 165/45 |

(56) References Cited

U.S. PATENT DOCUMENTS

| | | | |
|---|---|---|---|
| 4,632,604 A * | 12/1986 | McKelvy | E02B 17/028 165/45 |
| 4,633,948 A | 1/1987 | Closmann | |
| 4,642,987 A * | 2/1987 | Csorba | F03G 7/04 165/45 |
| 4,652,181 A | 3/1987 | Bergman et al. | |
| 4,671,351 A * | 6/1987 | Rappe | C02F 11/08 165/133 |
| 4,674,476 A * | 6/1987 | Wilson | F24D 11/0221 126/585 |
| 4,693,301 A * | 9/1987 | Baehrle | E01C 11/26 126/271.2 A |
| 4,723,604 A | 2/1988 | Emery | |
| 4,867,241 A | 9/1989 | Strubhar | |
| 4,912,941 A | 4/1990 | Büchi | |
| 4,974,675 A | 12/1990 | Austin et al. | |
| 4,977,961 A | 12/1990 | Avasthi | |
| 5,074,360 A | 12/1991 | Guinn | |
| 5,085,276 A | 2/1992 | Rivas et al. | |
| 5,088,471 A | 2/1992 | Bottum | |
| 5,355,688 A | 10/1994 | Rafalovich et al. | |
| 5,507,149 A * | 4/1996 | Dash | B09C 1/00 165/45 |
| 5,545,803 A * | 8/1996 | Heath | B09C 1/06 405/128.6 |
| 5,620,049 A | 4/1997 | Gipson et al. | |
| 5,678,626 A | 10/1997 | Gilles | |
| 5,937,663 A | 8/1999 | Chen et al. | |
| 5,937,934 A | 8/1999 | Hildebrand | |
| 5,941,238 A | 8/1999 | Tracy | |
| 6,098,705 A | 8/2000 | Kim | |
| 6,138,614 A | 10/2000 | Shropshire | |
| 6,199,515 B1 | 3/2001 | Clarke | |
| 6,247,313 B1 | 6/2001 | Moe et al. | |
| 6,367,566 B1 | 4/2002 | Hill | |
| 6,379,146 B1 | 4/2002 | Zink et al. | |
| 6,668,554 B1 | 12/2003 | Brown | |
| 6,701,914 B2 | 3/2004 | Schwarz | |
| 7,007,501 B2 | 3/2006 | Hu | |
| 7,228,908 B2 | 6/2007 | East, Jr. et al. | |
| 7,753,122 B2 | 7/2010 | Curlett | |
| 8,322,092 B2 | 12/2012 | Isaacs | |
| 8,595,998 B2 | 12/2013 | Isaacs | |
| 8,596,355 B2 | 12/2013 | Kaminsky et al. | |
| 8,770,284 B2 | 7/2014 | Meurer et al. | |
| 8,931,553 B2 | 1/2015 | Cannan et al. | |
| 9,028,171 B1 | 5/2015 | Seldner | |
| 9,080,441 B2 | 7/2015 | Meurer et al. | |
| 9,091,460 B2 | 7/2015 | Parrella, Sr. | |
| 9,181,931 B2 | 11/2015 | McBay | |
| 2002/0036076 A1 | 3/2002 | Eastman | |
| 2002/0179298 A1 | 12/2002 | Kopko | |
| 2004/0031585 A1 | 2/2004 | Johnson, Jr. et al. | |
| 2004/0140095 A1 * | 7/2004 | Vinegar | E21B 36/008 166/302 |
| 2004/0251011 A1 | 12/2004 | Kudo | |
| 2005/0045228 A1 * | 3/2005 | Labrador | E03B 1/02 137/357 |
| 2005/0120715 A1 * | 6/2005 | Labrador | F01K 27/00 60/618 |
| 2006/0107664 A1 | 5/2006 | Hudson et al. | |
| 2006/0108107 A1 | 5/2006 | Naukkarinen | |
| 2007/0017243 A1 | 1/2007 | Kidwell et al. | |
| 2007/0023163 A1 | 2/2007 | Kidwell et al. | |
| 2007/0039715 A1 * | 2/2007 | Brett | F24F 5/0017 165/48.2 |
| 2007/0125528 A1 | 6/2007 | Fakheri | |
| 2007/0158947 A1 | 7/2007 | Annen et al. | |
| 2008/0149573 A1 | 6/2008 | Fein et al. | |
| 2008/0163950 A1 | 7/2008 | Andersen et al. | |
| 2009/0020265 A1 | 1/2009 | Feinauer et al. | |
| 2009/0050067 A1 * | 2/2009 | Parsons | G06Q 99/00 119/200 |
| 2009/0120090 A1 | 5/2009 | DuBois | |
| 2009/0120091 A1 | 5/2009 | DuBois | |
| 2009/0211727 A1 | 8/2009 | Yin et al. | |
| 2010/0018679 A1 * | 1/2010 | Yang | F24F 5/0046 165/104.28 |
| 2010/0101767 A1 | 4/2010 | Furui et al. | |
| 2010/0230071 A1 | 9/2010 | Slater | |
| 2010/0294456 A1 | 11/2010 | Taraba et al. | |
| 2011/0030824 A1 | 2/2011 | Rauch | |
| 2011/0041784 A1 | 2/2011 | McAlister | |
| 2012/0006503 A1 | 1/2012 | Sun et al. | |
| 2012/0037335 A1 | 2/2012 | Asai et al. | |
| 2012/0048259 A1 | 3/2012 | Wagner et al. | |
| 2012/0085093 A1 * | 4/2012 | Kim | F24F 5/0046 60/641.8 |
| 2012/0132393 A1 | 5/2012 | Pilebro et al. | |
| 2012/0149944 A1 | 6/2012 | Zmierczak et al. | |
| 2012/0180508 A1 | 7/2012 | Endoh et al. | |
| 2012/0255706 A1 * | 10/2012 | Tadayon | F24J 3/081 165/47 |
| 2012/0318474 A1 | 12/2012 | Lieskoski | |
| 2013/0068418 A1 | 3/2013 | Gotland et al. | |
| 2013/0112155 A1 | 5/2013 | Abdel-Rehim et al. | |
| 2013/0232973 A1 | 9/2013 | McBay | |
| 2013/0333860 A1 | 12/2013 | Stubler | |
| 2013/0336721 A1 * | 12/2013 | McBride | E21D 11/00 405/55 |
| 2014/0262137 A1 | 9/2014 | McBay | |
| 2014/0318737 A1 | 10/2014 | Kaasa et al. | |
| 2015/0013949 A1 | 1/2015 | Arnot | |
| 2015/0276325 A1 | 10/2015 | Pilebro | |
| 2015/0283565 A1 | 10/2015 | Strand | |
| 2015/0292810 A1 | 10/2015 | Pilebro et al. | |
| 2015/0354903 A1 | 12/2015 | Pilebro | |

FOREIGN PATENT DOCUMENTS

| | | |
|---|---|---|
| CN | 102459824 | 5/2012 |
| CN | 102483311 | 5/2012 |
| CN | 102607208 | 7/2012 |
| CN | 102762948 | 10/2012 |
| DE | 130466 | 4/1978 |
| DE | 2801791 | 7/1979 |
| DE | 2811439 | 9/1979 |
| DE | 100 39 581 | 6/2002 |
| DE | 20 2006 012 225 | 10/2006 |
| DE | 102007056720 | 6/2009 |
| DE | 10 2008 001 308 | 7/2009 |
| DE | 102012211921 | 9/2014 |
| EP | 0198808 | 10/1986 |
| EP | 0271319 | 6/1988 |
| EP | 0 683 362 | 11/1995 |
| EP | 0819893 | 3/2009 |
| EP | 2031333 | 7/2009 |
| EP | 2078913 | 8/2009 |
| EP | 2085705 | 1/2010 |
| EP | 2141433 | 2/2012 |
| EP | 2418449 | 2/2012 |
| EP | 2479517 | 7/2012 |
| FR | 2826436 | 12/2002 |
| GB | 2459955 | 11/2009 |
| JP | S54128818 | 10/1979 |
| JP | 59-231395 | 12/1984 |
| JP | H0220799 | 5/1990 |
| JP | 5-179852 | 7/1993 |
| JP | H11158899 | 6/1999 |
| JP | 2001-193897 | 7/2001 |
| JP | 2002-173946 | 6/2002 |
| JP | 2002-194760 | 7/2002 |
| JP | 3648669 | 2/2005 |
| JP | 38-21938 | 9/2006 |
| JP | 2011-220603 | 11/2011 |
| KR | 10-2011-0046392 | 5/2011 |
| KR | 101170274 | 7/2012 |
| KR | 20120077106 | 7/2012 |
| WO | 83/00526 | 2/1983 |
| WO | 96/14544 | 5/1996 |
| WO | 2007/065001 | 6/2007 |
| WO | 2010/045011 | 4/2010 |

(56) References Cited

FOREIGN PATENT DOCUMENTS

| WO | 2011/016768 | 2/2011 |
|----|-------------|--------|
| WO | 2011-016768 | 2/2011 |
| WO | 2011/116736 | 9/2011 |
| WO | 2012/168352 | 12/2012 |
| WO | 2013/173709 | 11/2013 |

OTHER PUBLICATIONS

Riley, Alex. "BBC—Earth—A strange extinct animal made this giant stone corkscrew", Jul. 28, 2016. [Retrieved on Sep. 3, 2016]. Retrieved from the Internet: URL:<http://www.bbc.com/earth/story/20160727-extinct-giant-beavers-made-stone-corkscrews-instead-of-dams>.

"3.5 Hydradic Gradient and Energy Gradient", 5.4-1 to 5.4-99.

Peletier, Mark A. "Energies, gradient flows, and large deviations: a modelling point of view", Aug. 28, 2012. Version 0.2, pp. 1-31.

De Carli, Michele and Zarella, Angelo. "Modelling and Analysis of Helical Pipe in Ground Heat Exchanger Design", GSHP Associates Technical Seminar: Truly Renewable Heating & Cooling, London, Dec. 5, 2013, pp. 1-23.

"Iconic underground structures—TunnelTalk Iconic underground structures", Sep. 2010. [retrieved on Sep. 3, 2016]. Retrieved from the Internet:URL:<http://www.tunneltalk.com/Discussion-Forum-Sep10-Iconic-underground-structures.php>.

Wikipedia, the free encyclopedia: "List of spiral tunnels and tunnels on a curved alignment". [retrieved on Sep. 3, 2016]. Retrieved from the Internet:< URL: //https://en.wikipedia.org/wiki/List_of_spiral_tunnels_and_tunnels_on_a_curved_alignment>.

Pells, P.J. N. The Sydney Opera House Underground Parking Station.

Wikipedia, the free encyclopedia: "Skolithos". [retrieved on Sep. 3, 2016]. Retrieved from the Internet: URL:<https://en.wikipedia.org/wiki/Skolithos>.

"Analysis of short helical and double U-tube borehole heat exchangers: A simulation-based comparison" (abstract). Applied Energy, Dec. 2013. Available online:Jul. 12, 2013. [retrieved on Sep. 3, 2016]. Retrieved from the Internet: <http://zj5lm7ny2a.search.serialssolutions.com/ ... e=20131201 &au last=Zarrella,%20Angelo&spage=358&pages=358-370.

Nash, Darren. "Goannas Dig the Deepest, Twistiest Burrows of All-Scientific American Blog Network", Jul. 6, 2015. [retrieved on Sep. 3, 2016]. Retrieved from the Internet<URL:http://blogs.scientificamerican.com/tetrapod-zoology/goannas-dig-the-thedeepest-twistiest-burrows-of-all/.

"Tracing large tetrapod burrows from the Permian of Nei Mongol, China", Chinese Academy of Sciences, Dec. 31, 2013. [retrieved on Sep. 3, 2016]. Retrieved from the Internet:<URL:http://phys.org/news/2013-12-large-tetrapod-burrows-permian-nei.html>.

\* cited by examiner

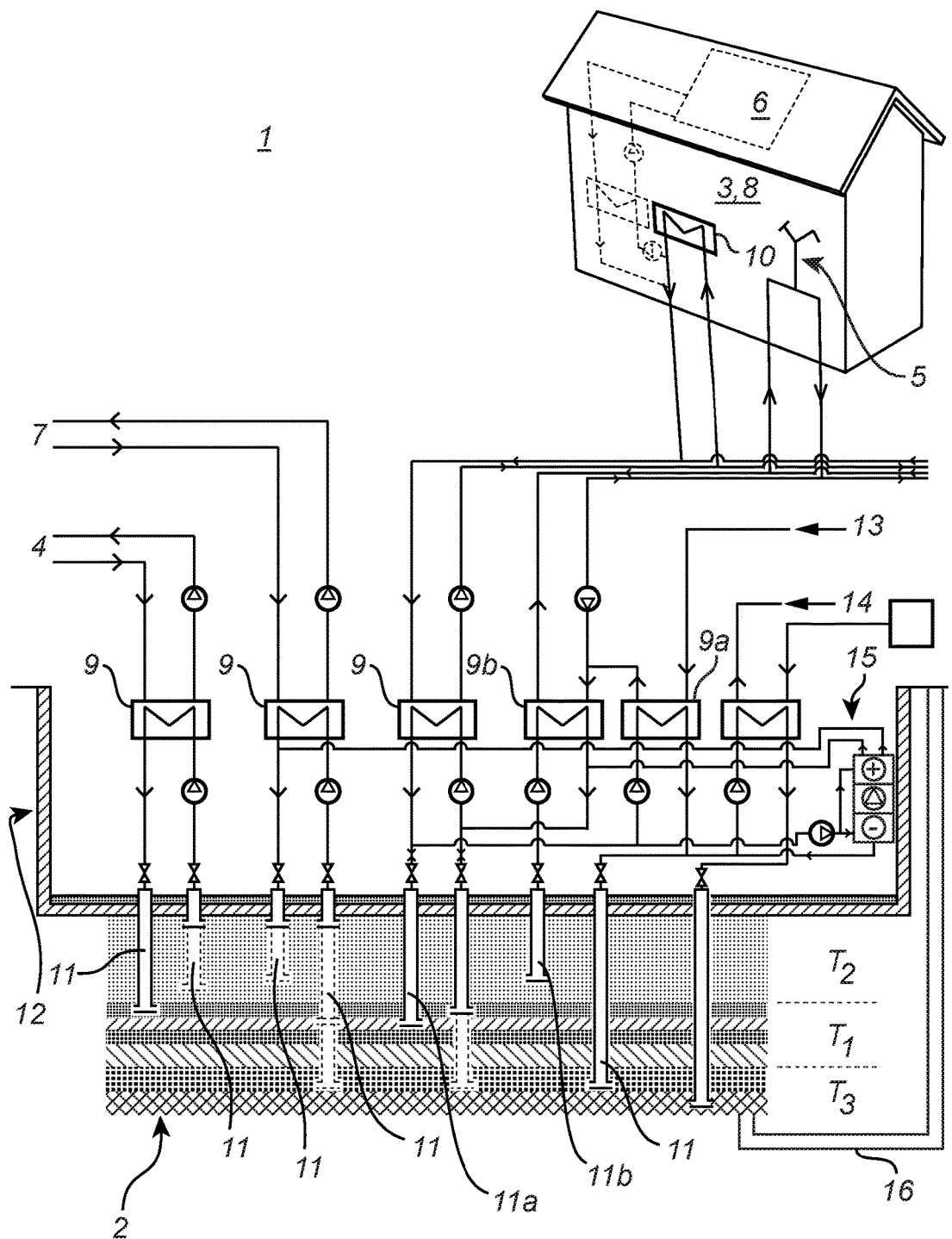

METHOD FOR OPERATING AN ARRANGEMENT FOR STORING THERMAL ENERGY

This application claims benefit from International Application No. PCT/SE2013/051281, which was filed on Nov. 1, 2013, which claims priority to Swedish Patent Application No. 1251241-4, which was filed Nov. 1, 2012, the entireties of said patent applications are incorporated herein by reference.

FIELD OF THE INVENTION

The present invention relates to a method for operating an arrangement for storing thermal energy.

BACKGROUND OF THE INVENTION

There is a need for efficient storage of thermal energy within the area of modern energy technology.

Thermal energy may advantageously be stored in a fluid, such as e.g. water, above ground in insulated tanks, in ground in insulated pits, or underground in excavated caverns, using the surrounding ground as insulation. The thermal energy of the fluid is preserved to a great extent during an extended period of time. Today, these methods are used in different parts of the world in order to satisfy the need for storing thermal energy between different seasons, e.g. storing temporary surplus heat which is used later on when there is a demand for it and, preferably, when its financial value is higher. The main transition of energy is from the summer half, when there is less need for heating, to the winter half, when the need for heating is much higher. However, there is also much to gain by using the storage for short-term variations and always actively storing surplus heat. These kinds of storages may also be used for storage of a colder fluid, to be used for cooling, as well as for fluid having an intermediate temperature, such as a fluid used in low temperature systems.

A substantial disadvantage with the arrangements for storing thermal energy underground which are available on the market today is that they, during use, contain large amounts of energy having an intermediate temperature. The intermediate temperature is not high enough to be used for different types of heating and it is not low enough to be used for cooling.

Swedish patent application 0950576-9 discloses one kind of efficient storage of thermal energy. However, there is still a need for an even more improved arrangement for storing thermal energy underground.

SUMMARY OF THE INVENTION

An object according to an aspect of present invention is to provide a method for operating an arrangement for storing thermal energy which renders the arrangement more efficient during use.

According to a first aspect of the present invention, these objects are achieved by a method for operating an arrangement for storing thermal energy, comprising an energy storage having a vertical temperature gradient and wherein the method comprises retrieving energy of a first temperature from the energy storage for use in a first heat-absorbing system, such that free space is created in the energy storage for energy of a second temperature, and wherein the second temperature is higher than the first temperature.

As energy at the first temperature is retrieved from the energy storage, free space is created for energy at the second temperature in the energy storage, which is advantageous. The energy at the second temperature may have a broader field of application than the energy at the first temperature and may be used in a second heat-absorbing system, which may be a high temperature system. The first temperature may be in the range of 15° C. to 65° C., and the second temperature may be in the range of 50° C. to 100° C. These are preferred temperature intervals for the first and second temperatures.

The method may further comprise receiving energy from the first heat-absorbing system, the energy being of a third temperature which is lower than the first and second temperature, and providing the energy at a level of the energy storage being of the third temperature. When the energy has been used in the first heat-absorbing system, the temperature of the fluid has decreased and the energy is therefore provided at a level in the energy storage where the temperature is lower than the first and second temperature. The third temperature may be in the range of 4° C. to 25° C. Energy having this third temperature may then be used in a cooling system such as, for example, a cooling coil for supply air, a room cooling coil, a fan coil, an under floor cooling coil, and a ceiling cooling coil.

The method may further comprise receiving energy at the second temperature from a heat-emitting system, and providing the energy at a level of the energy storage being at the second temperature. The heat-emitting system may be chosen from the group comprising an industrial facility or other sources of waste heat, a combined heat and power plant (CHP), solar panels for heating or for combined electrical generation and heating, a heat pump, a bio fuel boiler, an electrical heater, or a fossil fuel boiler. Since free space is created in the energy storage for energy at a second temperature when energy at the first temperature is retrieved, that space may be filled with energy of the second temperature, i.e. with energy having a broader field of application than the energy at the first temperature.

The method may further comprise receiving energy at the first temperature from a heat-emitting system, and providing the energy at a level of the energy storage being at the first temperature.

The method may further comprise retrieving energy at the second temperature from the energy storage for use in a second heat-absorbing system, and thereafter receiving energy at the first temperature from the second heat-absorbing system and providing the energy at a level of the energy storage being at the first temperature. When the energy at the second temperature has been used in the second heat-absorbing system, the temperature has decreased and the energy is therefore provided at a level in the energy storage where the temperature is lower than the second temperature.

The method may further comprise retrieving energy at the third temperature from the energy storage for use in a heat emitting cooling system, and thereafter receiving energy at the first temperature from the heat emitting cooling system and providing the energy at a level of the energy storage being at the first temperature. When the energy at the third temperature has been used in the heat emitting cooling system, the temperature has increased and the energy is therefore provided at a level in the energy storage where the temperature is higher than the third temperature. The cooling system may be chosen from the group consisting of a cooling coil for supply air, room cooling coil, fan coil, under floor cooling coil, and ceiling cooling coil. It may be noted that, when energy at the third temperature is retrieved from the energy storage and then returned at a higher temperature, heat sources such as human beings and lighting systems and other equipment in the building in essence serve as a heat source to the energy storage for possible later use. In this sense a cooling system is a heat-emitting system.

The method may further comprise receiving energy from an exterior of the arrangement, and providing the energy at a level of the energy storage being at the third temperature. As an example, energy from ice or snow may be also stored in the energy storage. When ice or snow is melted, this results in energy being of a low temperature, i.e. being in the temperature interval at the third temperature. Thus, that energy may be placed at a level of the energy storage being at the third temperature. This energy at the third temperature can also be received from a district cooling system.

The first heat-absorbing system may be a low temperature system. The first heat-absorbing system may be chosen from the group consisting of a radiator, supply air heating coil, an under floor heating coil, a ceiling heating coil, or a wall heating coil, which all are preferred embodiments.

The second heat-absorbing system may be a high temperature system.

The heat-emitting system may be chosen from the group consisting of an industrial facility or other sources of waste heat, a combined heat and power plant (CHP), solar panels for heating or for combined electrical generation and heating, a heat pump, a bio fuel boiler, an electrical heater, or a fossil fuel boiler.

The heat emitting cooling system may be chosen from the group consisting of a cooling coil for supply air, room cooling coil, fan coil, under floor cooling coil, and ceiling cooling coil.

In one embodiment, vertical temperature stratification is used in the energy storage in order to reduce the consumption of electrical energy while extracting thermal energy. A self-circulating motion of the fluid within the storage is generated due to differences in density between the different layers of fluid in the storage.

Further, the vertical temperature stratification may be used in order to generate electrical energy while extracting thermal energy. As mentioned above, the motion of the fluid within the storage is generated due to differences in density between the different layers of fluid in the storage. This is particularly useful in colder climates, where the possibility of generating electricity in this way is generally better during periods when electricity demand is high, especially during winter time.

In one embodiment an internal combined heating and cooling machine is used in order to increase the energy storage capacity of the energy storage. Such a heating and cooling machine uses mainly energy of an intermediate temperature, freeing up space for storing more energy of a high and a low temperature.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWING

This and other aspects of the present invention will now be described in more detail, with reference to the appended drawing showing a currently preferred embodiment of the invention.

FIG. 1 shows a schematic view of an arrangement for storing thermal energy according to a first embodiment of the invention.

DETAILED DESCRIPTION

FIG. 1 illustrates an arrangement 1 for storing thermal energy according to a first embodiment of the invention. The arrangement 1 comprises an energy storage 2, which may be a tank or an energy storage such as an underground cavern. The energy storage 2 is connected to first, second, and third heat-absorbing systems 3, 4, 5, first and second heat-emitting systems 6, 7 and a cooling system 8 via heat exchangers 9.

In this exemplary embodiment, the first heat-absorbing system 3 is a low temperature system such as a heating system for heating of buildings. The first heat-absorbing system 3 is connected to a heat exchanger 10. Energy of a first temperature $T_1$ is retrieved from the energy storage 2 and is used for heating buildings using the heat exchanger 10. Even though FIG. 1 shows only one building, it is possible, or even preferable, to connect the arrangement to a plurality of buildings.

The cooling system 8 is used for cooling buildings via heat exchanger 10. Energy of a third temperature $T_3$ is retrieved from the energy storage 2 and is used for cooling buildings using the heat exchanger 10.

The third heat-absorbing system 5 is a hot tap water system for buildings. Energy of a first temperature $T_1$ is retrieved from the energy storage 2 and is used for the hot tap water system.

The second heat-absorbing system 4 is a high temperature system and is, in this example, a district heating system. The second heat-absorbing system 4 is charged with energy of temperature $T_2$ from the energy storage 2.

The first heat-emitting system 6 is at least one solar collector. One or more solar collectors can form a solar heating system. The solar collector is charged with energy which is thereafter provided in the energy storage 2 at a level of temperature $T_2$ or $T_1$. The second heat-emitting system 7 is a district heating system. The second heat-emitting system 7 provides the energy storage 2 with energy of temperature $T_2$. The second heat-emitting system 7 can also provide the energy storage 2 with energy of temperature $T_1$ for example in order to increase the electrical output in a combined heat and power plant or by use of heat from condensing of exhaust flue gases. The use of the first heat-emitting system 6, i.e. solar collectors, is optional. It is possible to use different applications for connecting the solar collectors to the heat-emitting and/or heat-absorbing system of the building.

It is to be understood that any number and any type of heat-emitting, heat-absorbing and cooling systems can be connected to the arrangement 1 for storing thermal energy.

In the energy storage 2, energy of different temperatures is stored. The upper parts of the energy storage 2 have higher temperatures than the cooler, lower parts. This is due to the differences in density between fluids, i.e. liquid water, having different temperatures. There are layers having intermediate temperatures in the transition zone there between. In order to use the full potential of the storage, it is important to use the different, available temperatures effectively. One condition is that the storage is provided with inlets and outlets at different heights. Hence, there are a number of energy communication means 11, e.g. telescopic pipes, which run from a processing area 12, and which are arranged to retrieve a portion of the energy from the energy storage 2 at a suitable vertical level of the energy storage 2 so as to allow processing of the energy by means of at least one heat exchanger. By energy communication means 11 is, in this embodiment, meant fluid communication means. The energy communication means 11 are further arranged to return the processed energy to the energy storage 2 at a suitable vertical level of the energy storage 2. As an example, energy of a first temperature $T_1$ can be retrieved from the energy storage 2, at a level of said energy storage 2 being of said first temperature, for use in the first heat-absorbing system 3 in order to heat up buildings. When the energy has been used in the first heat-absorbing system 3, the temperature of the energy has decreased to a third temperature $T_3$ or a lower part of temperature $T_1$. The energy is then returned to the energy storage 2 at the corresponding temperature level. Another example is when energy at the first temperature $T_1$ is retrieved from the energy storage 2 at a level of the energy storage 2 being at the first temperature $T_1$. The energy is then heated via one of the heat exchangers 9 by heat from the solar collector to a second temperature $T_2$ or upper part of temperature $T_1$. Thereafter, the energy is returned to the energy storage 2 at a corresponding temperature level. The first temperature $T_1$ is in the range of 15° C. to 65° C., the second temperature $T_2$ is in the range of 50° C. to 100° C., and the third temperature $T_3$ is in the range of 4° C. to 25° C.

The energy storage 2 can accordingly be used both for heating, i.e. the energy which is returned to the energy storage 2 has a lower temperature than when it was extracted, and for cooling, i.e. the energy which is returned to the energy storage 2 has a higher temperature than when it was extracted.

Energy for cooling can be received from an exterior 13 of the arrangement 1 and this energy can be provided at a level of the energy storage 2 being at the third temperature $T_3$. The energy can, e.g., come from cold water. The energy can also be generated by an exterior source 14 connected to other cold sources such as ice, snow, cold air, a lake/river/sea, a chiller, or a district cooling system. If the energy comes from melted ice or snow, the ice or snow is preferably stored at a level above the ground water level such that polluted, melted water may be drained off. The melting may be done using energy of temperature $T_3$.

Further, the energy can also be generated by an exterior cold source 16 such as a second, separate storage for ice or snow, being connected to the energy storage 2. Ice or snow in the storage 16 may be created by freezing water from the energy storage 2, whereby the heaviest water, having a temperature of 4° C. is located at the bottom of the storage while ice, having a lower density than water, floats at the surface of the storage.

In one embodiment the energy for cooling and heating is supplied via an internal combined heating and cooling machine 15 such as, e.g., a heat pump. The heating and cooling machine 15 retrieves energy from a level of temperature $T_2$, $T_1$, or $T_3$ from the energy storage 2, while it returns heated energy to a level of temperature $T_2$ or $T_1$ and cooled energy to a level of temperature $T_2$, $T_1$, or $T_3$ in the energy storage 2. The person skilled in the field of energy realizes that the combined heating and cooling machine can be arranged in many different configurations to achieve high efficiency and flexibility.

In one embodiment, the arrangement 1 does not comprise a level with a temperature $T_3$. Instead, the arrangement 1 only comprises temperature levels $T_1$ and $T_2$.

In one embodiment, cold water, which, e.g., can be drinking water, of temperature $T_3$ from an exterior 13 is heated by heat exchanger 9a to a temperature of $T_1$. Heat exchanger 9a has, e.g., been supplied with energy of temperature $T_1$ via energy communication means 11a. After that, the water of temperature $T_1$ is heated by heat exchanger 9b to a temperature in a higher part of the range of $T_1$, alternatively, in a lower part of the range $T_2$. Heat exchanger 9b has, e.g., been supplied with energy of temperature $T_1$ or $T_2$ via energy communication means 11b. Thereafter, the water of temperature $T_1$ or $T_2$ can be used in the hot tap water system for buildings. As a non-limiting example, the temperature of the cold water from the exterior 13 can be in the range of 5-15° C. The temperature in the lower part of the range of $T_1$ can be in the range of 25-35° C. The temperature in the higher part of the range of $T_1$, alternatively, in the lower part of the range $T_2$, can be in the range of 55-65° C.

Warm liquid water has a lower density than cooler water in the range above 4° C., which causes water of different temperatures to be placed at different vertical levels within the energy storage, i.e. vertical temperature stratification. The difference in densities generates a gradient flow during the extraction of heat from the energy storage 2 as warm water, having a lower density, flows upwards through the storage to the heat exchanger where it is cooled down. In the return pipe, the difference in densities generates a downward flow of colder water. This results in two water pillars of different density causing a gravitational force, which can be used for gradient flow, in order to reduce the consumption of electrical energy.

While charging the energy storage with heat the effect is reversed, and an additional electrical energy source such as a pump or a motor has to be added to drive the flow.

Since charging of the energy storage is mainly performed during the summer while discharging is mainly performed during the winter, this implies that additional electric energy is needed for pumping during the summer but may be generated during the winter, when the demand and cost is higher, i.e. seasonal storage of electric energy. The additional electrical energy will be supplied by a pump with an electrical motor in the summer. The same pump-electrical motor will be used as a turbine-electrical generator during the winter. A large vertical height of the energy storage will increase this effect.

The person skilled in the art realizes that the present invention by no means is limited to the preferred embodiments described above. On the contrary, many modifications and variations are possible within the scope of the appended claims.

The invention claimed is:

1. A method for operating an arrangement (1) for storing fluid, said arrangement (1) comprising an underground energy storage (2) having a vertical temperature gradient, which method comprises retrieving fluid at a first temperature ($T_1$) from the energy storage (2) for use in a first heat-absorbing system (3) located above ground, such that free space is created in said energy storage (2) for fluid at a second temperature ($T_2$), wherein said second temperature ($T_2$) is higher than said first temperature ($T_1$), retrieving fluid at said second temperature ($T_2$) from the energy storage (2) for use in a second heat-absorbing system (4) located above ground, providing fluid at said second temperature ($T_2$) to a level of said energy storage (2) being at said second temperature ($T_2$), wherein the method further comprises
retrieving fluid at a third temperature ($T_3$) from said energy storage (2) for use in a heat emitting cooling system (8) located above ground, and
providing fluid at a said third temperature ($T_3$), which is lower than said first and second temperatures ($T_1$, $T_2$), to a level of said energy storage (2) being at said third temperature ($T_3$),
wherein said first heat-absorbing system (3) is configured to operate at a lower temperature than said second heat-absorbing system (4).

2. The method according to claim 1, further comprising receiving fluid at said third temperature ($T_3$) from said first heat-absorbing system (3) and providing said fluid at a level of said energy storage (2) being at said third temperature ($T_3$).

3. The method according to claim 1, further comprising receiving fluid at said second temperature ($T_2$) from a heat-emitting system (6, 7), and providing said fluid at a level of said energy storage (2) being at said second temperature ($T_2$).

4. The method according to claim 1, further comprising receiving fluid at said first temperature ($T_1$) from a heat-emitting system (6, 7), and providing said fluid at a level of said energy storage (2) being at said first temperature ($T_1$).

5. The method according to claim 1, further comprising receiving fluid at said first temperature ($T_1$) from said second heat-absorbing system (4) and providing said energy at a level of said energy storage (2) being at said first temperature ($T_1$).

6. The method according to claim 1, further comprising receiving fluid at said first temperature ($T_1$) from said heat emitting cooling system (8) and providing said fluid at a level of said energy storage (2) being at said first temperature ($T_1$).

7. The method according to claim 1, further comprising receiving fluid from an exterior (13, 14) of said arrangement (1), and providing said energy at a level of said energy storage (2) being at said third temperature ($T_3$).

8. The method according to claim 1, wherein said first temperature ($T_1$) is in the range of 15° C. to 65° C.

9. The method according to claim 1, wherein said second temperature ($T_2$) is in the range of 50° C. to 100° C.

10. The method according to claim 1, wherein said third temperature ($T_3$) is in the range of 4° C. to 25° C.

11. The method according to claim 1, wherein vertical temperature stratification is used in the energy storage (2) in order to generate a gradient flow due to differences in density between vertical levels, wherein warm water flows upwards through the energy storage to a heat exchanger where it is cooled down, and colder water flows downward through the energy storage.

* * * * *